P. FUHRER.
SPRING WHEEL.
APPLICATION FILED MAR. 28, 1914.
1,119,267.
Patented Dec. 1, 1914.
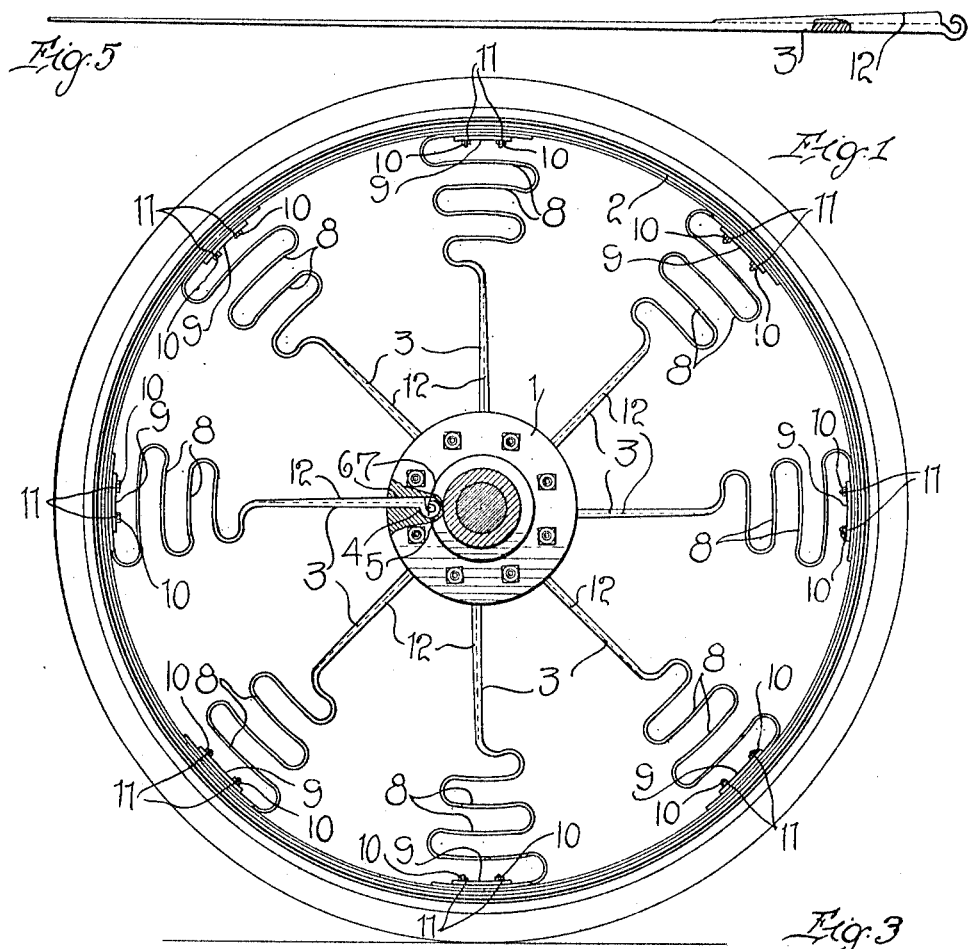
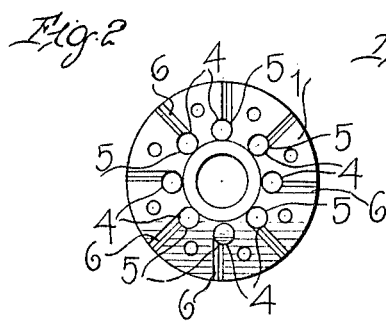
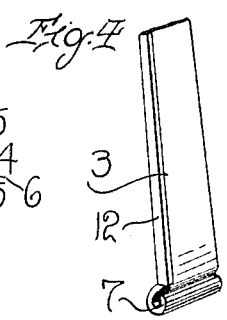
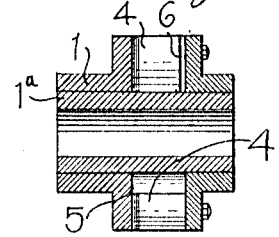
Witnesses
Robert M. Sutphen
A. J. Hind
Inventor
Paul Fuhrer
By Watson E. Coleman
Attorney

UNITED STATES PATENT OFFICE.

PAUL FUHRER, OF DENVER, COLORADO.

SPRING-WHEEL.

1,119,267.    Specification of Letters Patent.    Patented Dec. 1, 1914.

Application filed March 28, 1914. Serial No. 827,960.

*To all whom it may concern:*

Be it known that I, PAUL FUHRER, a citizen of the United States, residing at Denver, in the county of Denver and State of Colorado, have invented certain new and useful Improvements in Spring-Wheels, of which the following is a specification, reference being had to the accompanying drawings.
This invention relates to spring wheels for vehicles, and more particularly to that class of spring wheels in which spring spokes are connected at their opposite ends to the hub and rim of the wheel to obviate the necessity of employing a pneumatic tire to absorb the shocks due to uneven surfaces in the roadway.

An object of this invention is the provision of spring spokes for vehicle wheels, each of the spokes being connected at one end to the hub of the wheel, the outer end of each spoke being formed with a plurality of convolutions, the outermost of which is secured to the inner face of the rim of the wheel.

A further object of this invention is the provision of novel means for connecting the inner ends of the spokes to the hub of the wheel.
With these and other objects in view, my invention consists in the novel construction, combination, and arrangement of parts to be hereinafter more fully described, claimed, and illustrated in the accompanying drawing, in which, Figure 1 is a side elevation of the wheel with the hub partly in section, showing the manner of mounting the inner end of one of the spring spokes therein; Fig. 2 is a side elevation of the hub with the hub cap removed: Fig. 3 is a transverse section of the hub; Fig. 4 is a perspective view of the inner end of one of the spring spokes; and Fig. 5 is a view of one of the spring spokes in blank form.

Referring more particularly to the drawing, the wheel comprises a hub 1, rim 2, and a plurality of spring spokes 3, the rim having the usual outwardly extending flanges on its opposite edges for engagement with the tire of the wheel. The hub 1 is formed with a plurality of radially disposed sockets 4, the sockets being open at the periphery of the hub and at one side thereof. The inner end of each socket is formed with an enlarged portion 5 which is cylindrical in form. The hub is also provided with a plurality of radially extending notches 6, each of the notches being disposed adjacent one side of one of the sockets and communicating therewith. Each of the spokes 3 is formed of an elongated plate of spring steel or other suitable metal, the inner end of each spring being curled or beaded as at 7, to form a head for engagement with the enlarged portion 5 in one of the sockets 4 in the hub. Each of the spokes 3 extends radially from the hub for a portion of its length, the outer end of the spoke being curved to form a series of convolutions 8 at its outer end, the convolutions increasing in width from the inner to the outermost convolution. The outermost convolution of each spoke is adapted to bear against the inner face of the rim 2 and a wearing plate 9 is disposed against the inner face of each outermost convolution, the said outermost convolutions being secured to the rim by the bolts 10, the nuts 11 of which bear against the wearing plate 9. The radially extending portion of each spoke is formed on one edge with a laterally extending flange 12, the flange decreasing in width from the inner end of the spoke to the innermost convolution thereof, the flange serving to strengthen the inner end of the spoke to prevent lateral bending thereof with relation to the hub of the wheel.

It will be seen from the drawing, that the inner end of each spoke is mounted in one of the sockets 4 in the head so that the head 7 engages in the enlarged portion of its socket, and as the inner end of the flange 12 of each spoke engages the walls of the notch 6 which communicates with the socket, it will be seen that the inner ends of the spokes are held rigidly within the hub and prevented from movement in any direction. To securely maintain the inner ends of the spokes in engagement with the hub, a hub cap 13 is provided which is secured to the hub by suitable bolts 14, the hub cap closing the open ends of the sockets, thereby entirely inclosing the inner ends of the spokes and preventing displacement thereof from the sockets. As shown in the drawing, each of the spokes decreases in thickness from the inner convolution thereof to the outer end of the spoke, thereby rendering the outer ends of the spokes more sensitive to shocks than the inner ends thereof so that the shocks are gradually absorbed throughout the entire length of the spokes. As shown in Fig. 3 of the drawing, the hub 1 is provided with a sleeve 1ª extending therethrough, the sleeve 1ª being adapted to close the inner ends of the sockets 4, to limit the inward movement of the spokes with relation to the hub.

Having thus fully described my invention, what I desire to secure and claim by Letters Patent, is:—

A spring wheel comprising a hub, a rim, said hub having a plurality of radially extending sockets formed therein, the inner end of each socket being formed with an enlarged cylindrical portion, said hub being also provided with a plurality of radially extending notches each of which being disposed adjacent one side of one of the sockets and communicating therewith, a plurality of spokes connected at their outer ends to said rim, the inner end of each spoke being mounted in one of the sockets and having an enlarged head formed thereon for engagement in the enlarged cylindrical portion of the socket, each of said spokes being formed on one edge with a laterally directed flange for engagement in the notch adjacent one side of its corresponding socket, and said flanges decreasing in width from the inner end of the spokes to the outer extremity of the flanges.

In testimony whereof I hereunto affix my signature in the presence of two witnesses.

PAUL FUHRER.

Witnesses:
KATHERINE V. BAKER,
HAMLET J. BARRY.

Copies of this patent may be obtained for five cents each, by addressing the "Commissioner of Patents, Washington, D. C."